E. B. CADE.
MEASURING DEVICE.
APPLICATION FILED APR. 17, 1918.

1,300,116.

Patented Apr. 8, 1919.

Inventor
Enos B. Cade.
By Henry L. Reynolds
Attorney

UNITED STATES PATENT OFFICE.

ENOS B. CADE, OF SEATTLE, WASHINGTON.

MEASURING DEVICE.

1,300,116.      Specification of Letters Patent.      Patented Apr. 8, 1919.

Application filed April 17, 1918. Serial No. 228,997.

*To all whom it may concern:*

Be it known that I, ENOS B. CADE, a citizen of the United States, and resident of the city of Seattle, county of King, and State of Washington, have invented certain new and useful Improvements in Measuring Devices, of which the following is a specification.

My invention relates to liquid measuring or metering devices and consists of a device which is designed for attachment to a source of supply of liquid and which measures the amount of liquid being delivered as it passes therethrough and is designed particularly for use in delivering oils and such liquids in which accuracy of measuring is highly desirable.

The object of my invention is to provide a device for measuring liquid under such conditions and which shall be simple and thoroughly reliable in construction and which will work with a high degree of accuracy.

My invention comprises the parts and combinations of parts which will be hereinafter described and then particularly pointed out in the claims.

In the accompanying drawings I have shown my invention in the form of construction which is now preferred by me. It will, however, be evident to any mechanic that many of the minor details of construction may be changed without essentially changing the character of the device.

Figure 1:
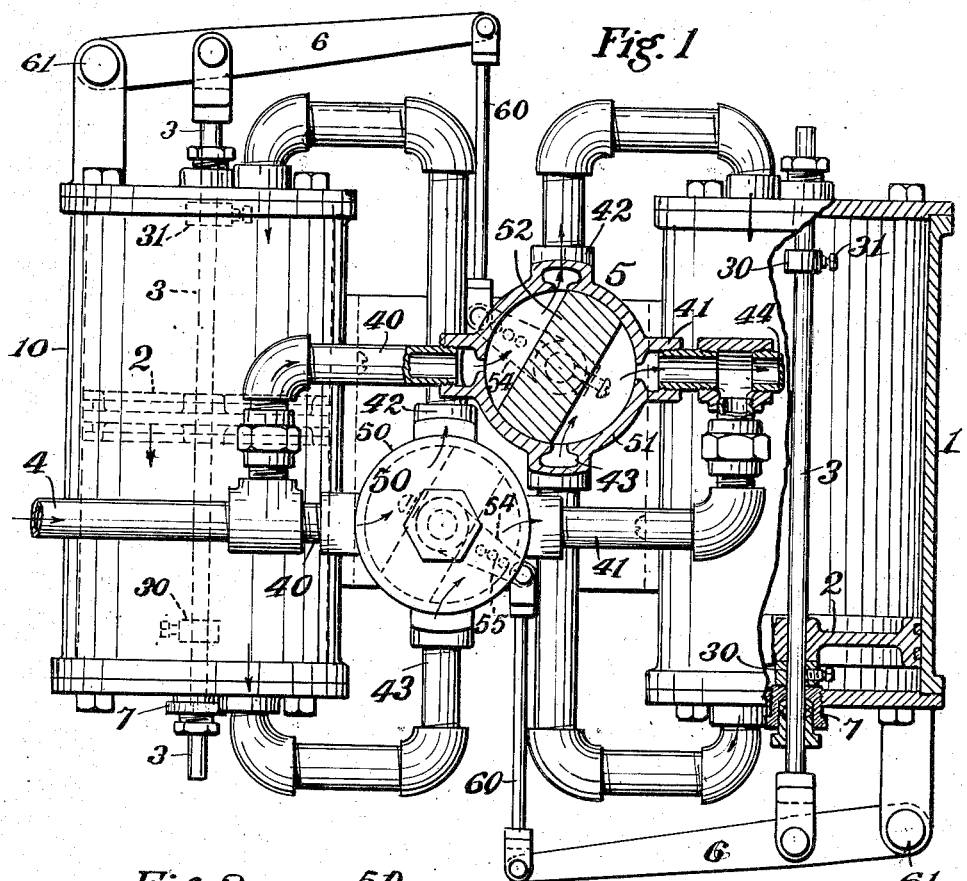
Figure 2:
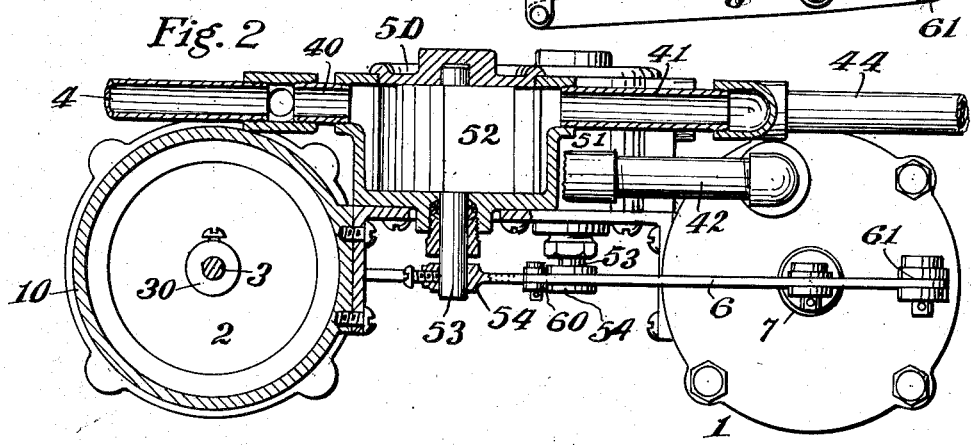

Figure 1 is an elevation of the device showing portions thereof in section, and Fig. 2 a plan view also showing portions thereof in section.

The measuring elements of my device consist of two cylinders, 1 and 10, which are alike in construction and each of which is provided with like parts coöperating therewith. A description of one and the parts coöperating therewith will, therefore, serve as a description of the entire device.

The cylinders used are preferably made of such a size as to conform in their capacity with some unit of measurement. In each cylinder is found a piston 2, which piston has a hole centrally thereof through which passes a rod 3. This rod and the piston are not attached. In fact, the piston moves back and forth over the rod. The piston may be said to be a floating piston, that is, it has no piston rod. The rod 3 is a tappet rod carrying a tappet 30 at each end thereof.

These tappets are fixed upon the rod, preferably in such manner that they may be adjusted in position as may be found necessary to secure accurate operation of the valves. I have shown this result as secured by the use of set screws 31, although any other means may be employed.

The source of supply of the liquid being measured is through the pipe 4. This pipe branches so as to supply the liquid to both of two valve mechanisms, 5 and 50, which valve mechanisms are alike in construction. These valve mechanisms may be of any suitable type which is provided with four-way pipe connections so that by shifting the valve, the liquid may pass from the supply to either end of the cylinder, and then by shifting to the other position the same liquid may pass from either end of the cylinder to the discharge.

As shown, the valve consists of a cylindrical casing 51, having therein a valve 52 which is mounted to be turned about the axis of the cylinder 51. The valve casing is provided with four ports, one of which connects with the branch 40 of the supply pipe. Directly opposite this is the branch 41 of the discharge pipe. At points between these two, as shown in the drawings being 90° therefrom, are the two ports connecting with pipes 42 and 43, these being connected, respectively, with opposite ends of the cylinder 1.

The valve 52 has a shaft 53 projecting from the valve casing 51. This shaft has a short arm 54 secured thereto and a rod 60 connects this valve arm with a lever 6 which is pivoted upon a fixed support, as at 61, and is also pivotally connected with the tappet rod 3, which extends through the cylinder and the piston. One or both of these pivots should have sufficient slackness lengthwise of the lever to accommodate the arcuate movement of the lever 6. In the course of the movement of the piston toward one end of the cylinder it will eventually strike one of the tappets 30. Its further movement will move the tappet rod 3 and thereby communicate its movement to the lever 6. Attention is called to the fact that the valve which is controlled by the piston of one of the cylinders is the valve which controls the supply of liquid to its companion cylinder whereby each piston acts as the means for operating the valve which controls the liquid supply to and from the other cylinder.

In the position of the parts shown in Fig. 1, the piston in the cylinder 1 has thrown the valve contained in the casing 50 which controls the supply of the companion cylinder 10. The piston 2 of cylinder 10 has started downward and is shown by dotted lines at about the middle point of the cylinder. The tappet 30 at the lower end of the cylinder 10 is shown as raised slightly above the cylinder head. When the piston 2 strikes this it will cause the tappet rod 3 to be moved downward and thereby throw the valve in the other valve casing 5 into position so as to cause the supply to flow to the bottom end of the cylinder 1, thus raising the piston 2 in this cylinder.

The movement of each one of the pistons 2 is controlled by contact of the tappets 30 with the cylinder heads, these tappets being interposed between the piston and the cylinder heads. It is evident that if means be provided by which the position of the surface of the cylinder head which stops the tappet can be adjusted, the delivery capacity of the cylinder may be varied. In this way the delivery of the device may be adjusted so as to secure great accuracy. It is, of course, evident that if this adjustable stop device were made to directly contact with the piston 2, the effect would be identical. I prefer, however, to make the same to act through the tappets 30, the latter acting as spacers between the piston 2 and the cylinder heads.

The manner of doing this which I prefer, is herein shown and consists of employing a cup-like sleeve 7, which screws into the cylinder head and which is bored to receive the tappet rod 3. This sleeve may also serve as the casing for the packing gland by which the leakage about the tappet rod is prevented. By turning the sleeve 7 the position of its inner surface is adjusted so as to secure adjustment of the point at which the piston is stopped with great accuracy.

The particular construction just described for this adjustable stop is given merely as illustrative of a preferred manner of securing this result. The essential feature sought is to provide an adjustable stop for the piston which may be operated for adjustment from without the cylinder and without disturbing any other part of the device. I have herein shown such a stop for one end only of the cylinder. This is all that is necessary if the capacity of the cylinder has been estimated with reasonable accuracy when first constructed.

It is believed that the operation of this device is clear without further setting the same forth. It is, of course, assumed that the liquid is delivered to the device under enough pressure to overcome the friction of the parts and to operate the device. The piston of one cylinder is employed for operating the valve of the other cylinder and in this manner the operation of the device is made certain and reliable. The entire construction of the device is of such character that its operation may be depended upon for accuracy and also for reliability. It has no parts which may not be kept in first class operating condition and of such a character that it may not be understood and repaired by any person having any mechanical ability. In fact, it may be operated by the most ordinary kind of labor. The grouping and arrangement of the parts may, of course, be arranged as thought necessary without changing the principles involved and the method of operation.

What I claim as my invention is:

1. In a liquid measuring device, two cylinders, a floating piston in each, a tappet rod for each cylinder passing through the cylinder heads and the piston, tappet collars carried by said rods between the piston and each cylinder head and adapted by engagement with both to form a positive stop for the pistons, members carried by the cylinder heads and adjustable from without the cylinders and adapted to serve as stops for the tappet collars, a valve for each cylinder, and means for operating each valve from the tappet rod of the other cylinder.

2. In a measuring device, in combination, two measuring cylinders, each cylinder having a piston therein and a valve means controlling the supply and discharge of the liquid for each cylinder, means actuated by each piston to actuate the valve means for the other cylinder, said means each comprising a rod passing through the cylinder head and a collar on said rod within said head, a sleeve surrounding said rod and passing through the head to serve as a stop for said collar, and means for adjusting said sleeve axially of the cylinder.

3. In a liquid measuring device, two cylinders, a floating piston in each cylinder, a tappet rod for each cylinder passing through the cylinder heads and the piston, a valve for each cylinder, connections between the valves and the tappet rods, stop sleeves through which the tappet rods slide, said sleeves being threaded into the cylinder heads to render them longitudinally adjustable with relation to the tappet rods and glands threaded into said sleeves and embracing the tappet rods.

Signed at Seattle, Washington, this 8th day of April, 1918.

ENOS B. CADE.